Oct. 1, 1968  A. ESCHNER, JR  3,404,399

DIGITAL CLUTTER REJECTION SYSTEM

Filed April 22, 1966  5 Sheets-Sheet 1

INVENTOR.
ALBERT ESCHNER, JR.,
BY J. K. Haskell
ATTORNEY.

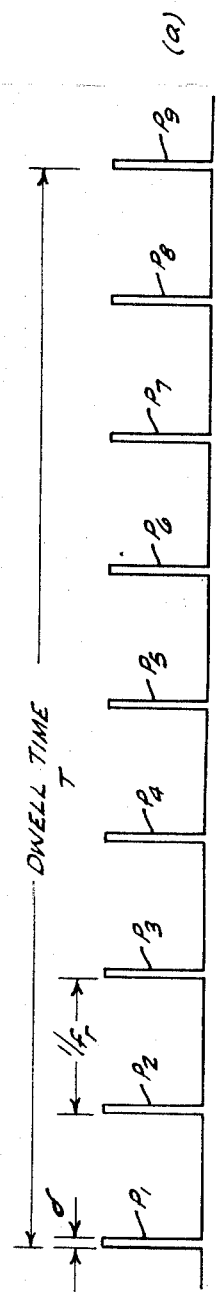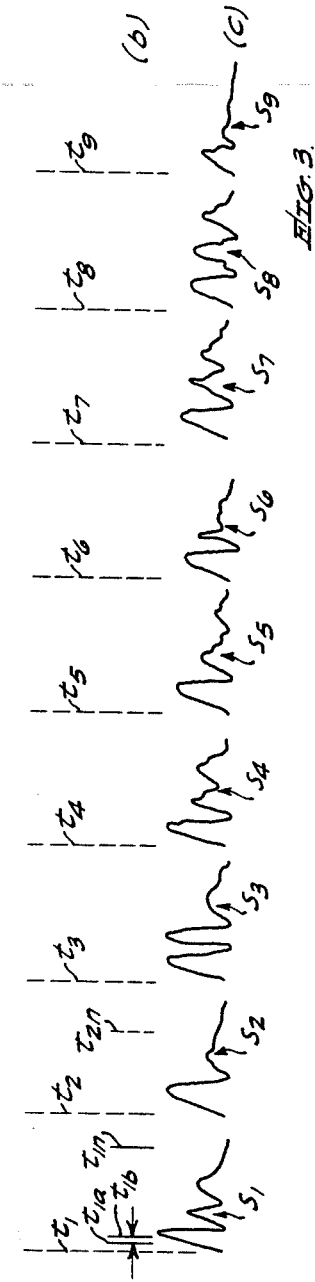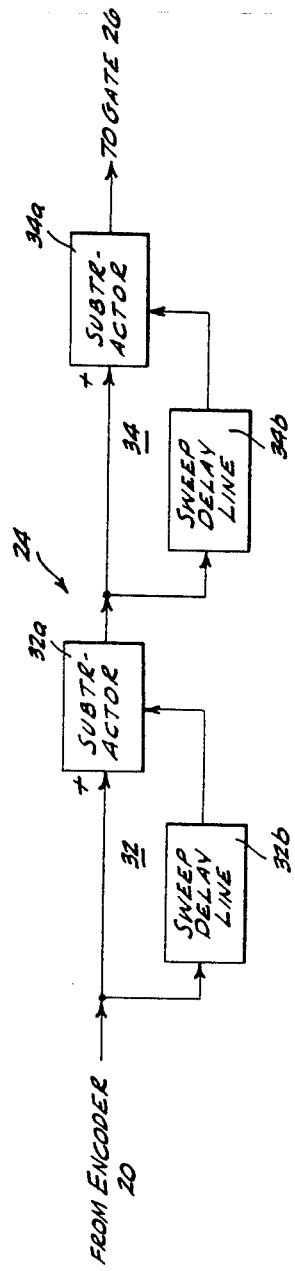
Fig. 3
Fig. 4

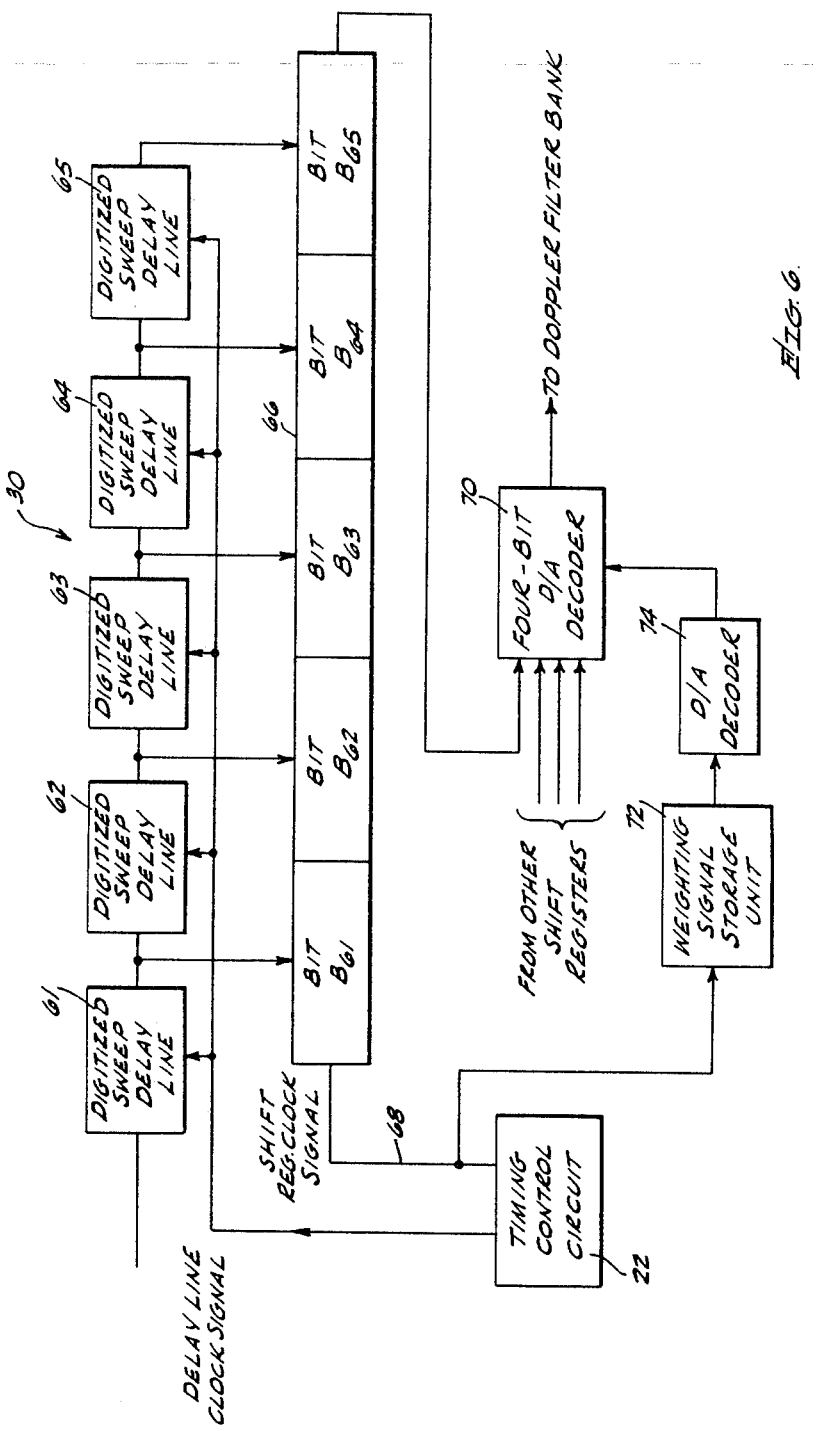

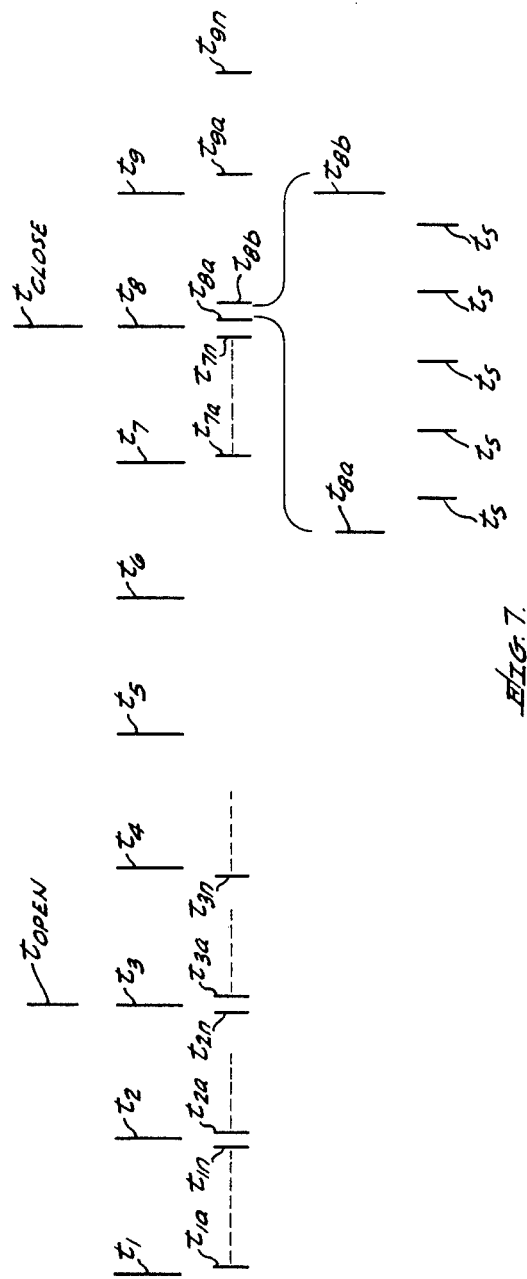

United States Patent Office 3,404,399
Patented Oct. 1, 1968

3,404,399
DIGITAL CLUTTER REJECTION SYSTEM
Albert Eschner, Jr., Fullerton, Calif., assignor to Hughes Aircraft Company, Culver City, Calif., a corporation of Delaware
Filed Apr. 22, 1966, Ser. No. 545,804
14 Claims. (Cl. 343—7.7)

ABSTRACT OF THE DISCLOSURE

A clutter rejection system including a moving target digital cancellation stage and a transient suppression gate which prevents preselected sweeps of the radar dwell time which have not been completely cancelled from passing to the accompanying processor. As a result, the spreading of the clutter frequency spectrum is greatly reduced to decrease the clutter to target signal ratio in the target frequency region. The system also includes a clutter rejection range gated Doppler filter system requiring a minimum number of filters.

---

This invention relates to radar circuitry and more particularly to a digital clutter rejection system.

It is well appreciated that the problems of detecting targets by analyzing their echoes in a radar system is greatly complicated by the presence of echoes from large non-target sources, such as ground and weather. These echoes, generally referred to as clutter, have frequency cross-sections and amplitudes many times that of targets. Thus unless special techniques are employed to separate the clutter from the target echoes by rejecting the clutter effect, conventional radar becomes useless since the clutter may completely overshadow the target.

One of the techniques used for clutter rejection is based on frequency filtering. The spectrum of clutter is made to fall in the reject band of filters, whereas that of the targets falls in the pass band. Conventionally, this processing is accomplished by means of either single or double cancellation units which delay signals by one or more interpulse periods and subtract them to create a comb filter with reject bands at the clutter frequencies.

In another clutter rejection system, analog signals are gated in range and presented to a bank of narrow band Doppler filters which perform spectral separation of target and clutter signals. Each range gate feeds an identical bank of Doppler filters and detectors for target clutter signal separation from the particular range gate. Such a system which may be thought of as a range gated Doppler filter clutter rejection system, has herebefore only been practical when the radar's pulse repetition frequency (PRF) was high enough, so that the number of range gates was sufficiently small to make the system feasible. Low PRF's are not utilized in such a system because with low PRF's the number of range gates required becomes quite large and since each gate needs its own filter band and detector bank, the required circuitry becomes too complex and expensive. Clutter rejection range gated Doppler filter techniques, therefore, have been used mostly with high PRF's which are rarely employed in ground based radar because high PRF's produce unacceptable returns from the antenna side lobes. When employing lower PRF's with cancellation techniques, gain matching problems and signal delay inaccuracies, as well as unavoidable drift of the analog amplifiers, have been experienced which increase the target clutter separation problems.

An additional complicating factor in prior art clutter rejection systems is the frequency spectrum produced by clutter which is illuminated by signals and transmitted during a finite period or dwell time of a limited duration. As is appreciated by those familar wth the art, limited dwell time results in the spreading of the clutter frequency spectrum, often overshadowing the spectrum of the targets to be detected.

Accordingly, it is an object of the present invention to provide a new clutter rejection system.

Another object is to provide a new clutter rejection system in which amplification drift, time delay inaccuracies and signal gain matching problems present when employing analog signal techniques are greatly minimized.

A further object is to provide a clutter rejection range gated Doppler filter system which is less complex and more stable than prior art systems.

Still another object is to provide a clutter rejection system in which the effect of clutter frequency spectrum due to limited illumination dwell time is greatly minimized.

Yet another object is to provide a new highly stable clutter rejection system equally adaptable for high or low PRF's without a substantial increase in circuitry.

These and other objects of the invention are achieved by providing a clutter rejection system in which digital circuits are extensively used to minimize the adverse effect if amplification drift, time delay and gain variations experienced in analog circuits. The system to be described hereafter in detail includes an analog-to-digital (A/D) encoder which converts the incoming clutter and target echoes, also known as radar video, from each radar pulse to digital signals. The encoder output which changes value at a selected range sampling rate is supplied to a digital cancellation stage, where the frequency modulation components of the radar video, produced by the clutter are greatly reduced in amplitude, while the frequency modulation components representing target echoes are passed through, substantially unaltered.

The cancellation stage comprises one or more digital cancellation units, wherein the delay accuracy need be controlled only to a portion of the sampling interval, equal to a range bin interval. Thus, the need for very precise delay timing is eliminated. Also, by converting the radar video to digital signals, the problem of accurate analog signal gain matching in parallel channels is eliminated.

The output of the cancellation stage is supplied to a digital signal processor through a transient suppression gate, the function of which is to prevent preselected sweeps of the radar dwell time which have not been completely cancelled from passing to the processor. As a result, the spreading of clutter frequency spectrum is greatly reduced, thereby decreasing the clutter to target signal ratio in the target frequency region. When using two cancellation units, video from at least the first two and the last two sweeps of each dwell time is prevented from reaching the processor, which includes a plurality of digital storage means, so that all the digital signals of the selected sweeps of a complete dwell time are simultaneously available. The signals from each range are serially read out into a digital to analog (D/A) converter, the output of which is then supplied to a Doppler processor including a single band of Doppler filters and related target detectors. Thus, irrespective of the PRF rate only a single bank of filters is necessary to provide target data from any selected number of ranges.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 2:
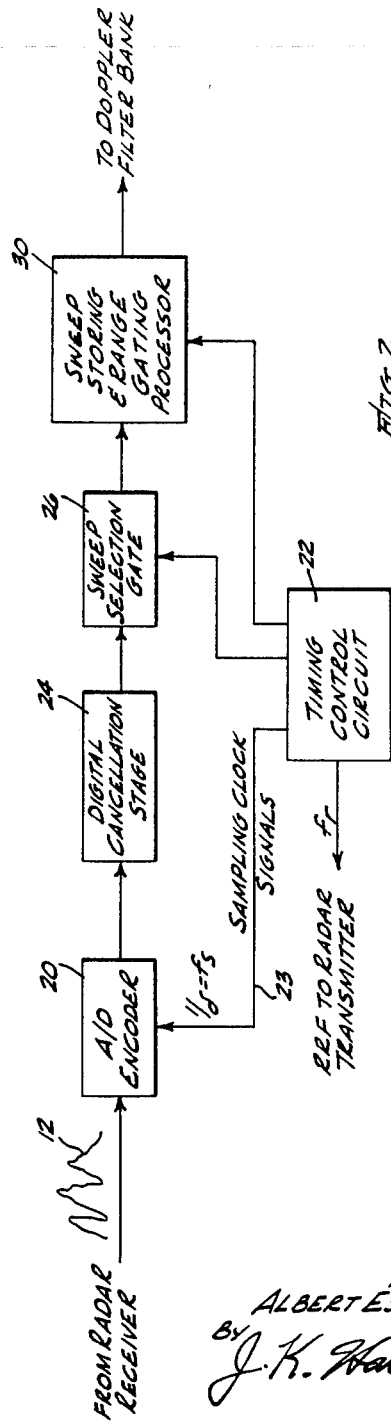
FIGURE 2 is a general block diagram of the digital clutter rejection system of the present invention.

FIGURES 3(a), and 3(b) and 3(c) are waveform and timing diagrams useful in explaining the invention;

FIGURE 4 is a block diagram of the cancellation stage, shown in FIGURE 2;

FIGURES 5(a) through 5(g) are waveform diagrams useful in explaining the principles governing the selection of signals by gate 26;

FIGURE 6 is a block diagram of the processor shown in FIGURE 2; and

FIGURE 7 is a timing line diagram useful in explaining the timing relationships present in the novel system of the present invention.

Figure 1:
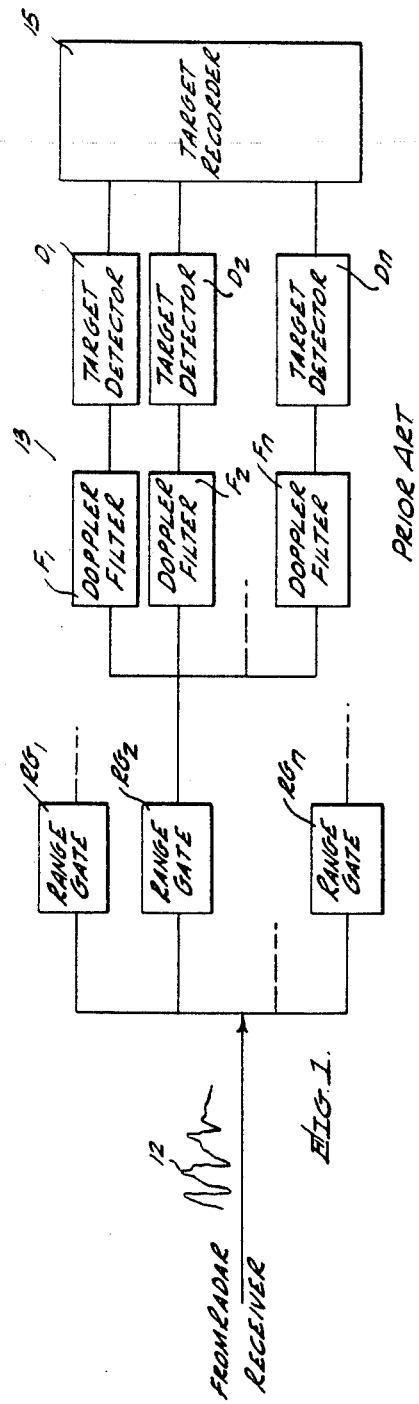
FIGURE 1 is a block diagram of a prior art range gated Doppler filter system.

For a better understanding of the teachings of the present invention, reference is first made to FIGURE 1 wherein is shown a prior art arrangement of a processor which accomplishes range gating and Doppler filtering of a radar video sweep 12 supplied to the processor from a radar receiver (not shown). The radar video 12, in the form of an analog sweep is supplied to a set of range gates designated $RG_1$ through $RG_n$, each gate having a duration $\delta$. The gates are contiguous over the entire interpulse period betwen radar pulses, transmitted at a selected pulse repetition frequency, known as PRF. Each range gate feeds an identical bank of Doppler filters $F_1$ through $F_n$, for extracting target signals. The presence of targets at any of the selected ranges is supplied to a target recorder 15 wherein the targets are recorded or displayed in any conventional manner.

This conventional approach of feeding a bank of Doppler filters and detectors from each of the range gates is feasible only in a system with a high PRF, so that there are only a few range gates to examine and therefore only a few Doppler filter banks are necessary. However, in a search system with a low or medium PRF, the number of range gates and filters becomes most excessive. For example, a system with a PRF of two kilocycles (kc.) and a 0.5 microsecond (ms.) pulse width would require a thousand range gates each followed by its individual bank of Doppler filters. Such a system would be most complex and expensive to be practically operable.

In accordance with the teachings of the present invention, however, the need of feeding an identical bank of Doppler filters from each of the range gates is eliminated. This is accomplished by employing digital signal techniques, whereby a series of analog sweeps are digitized into digital numbers or signals which are stored in such a manner that a single bank of Doppler filters is suppliable with a sequence of groups of digital signals, each group representing the radar video received from a particular range in the series of the analog sweeps. In addition, in accordance with the teachings of the present invention, digital cancellation techniques are employed to substantially reduce the clutter, forming a part of the radar video, in order to enhance the signals received from targets which are to be detected.

Reference is now made to FIGURE 2 which is a block diagram of the digital clutter rejection system of the present invention. As seen, it includes an analog-to-digital (A/D) encoder 20 which is provided with the radar video in the form of analog sweeps such as sweep 12 from a radar receiver. The output of encoder 20 which is controlled by a timing control circuit 22 is a series of digital multibit numbers produced at a sampling rate which is determined by the rate of sampling clock signals from the timing control circuit 22 supplied to encoder 20 via line 23.

The timing control circuit 22 which is a precision crystal oscillator provides the sampling clock signals at a sampling rate which is equal to the width of the pulses transmitted by the radar transmitter (not shown) at a selected PRF $f_r$. The latter frequency may also be controlled by the control circuit 22. Assuming that each of the pulses transmitted at the PRF $f_r$ has a pulse width $\delta$, the sampling clock signals are supplied at a sampling frequency $f_s$ which at least equals $1/\delta$. As a result, the output of encoder 20 which is a digital number, changes once each sampling interval with each digital number representing the radar video from another range interval.

Reference is now made to FIGURES 3(a), 3(b), and 3(c) which are waveform diagrams useful in explaining the present invention. Let us assume that during a selected dwell time T, radar pulses $P_1$ through $P_9$ are transmitted at times $t_1$ through $t_9$ respectively, the PRF being $f_r$ and the pulse width $\delta$. It is appreciated that in response to each transmitted pulse, energy from targets and other sources is reflected which may be received by a radar receiver wherein its forms radar video or analog sweeps designated in FIGURE 3(c) as $S_1$ through $S_9$. Assuming that the video received during each $\delta$ interval is from another target range interval, in accordance with the teachings of the invention, control circuit 22 provides sampling clock signals at a rate $1/\delta$ during each interpulse period $1/f_r$. Thus the output of encoder 20 between each interpulse period is a group of digital numbers, each representing video from another range. In FIGURE 3(b), lines $t_{1a}$ through $t_{1n}$ represent the times, during the interpulse period between $t_1$ and $t_2$, when sampling clock signals are supplied to encoder 20 to digitize the analog sweep $S_1$ into a group of digital numbers, each representing the video in sweep $S_1$ from a different range. At present, encoders are available which are capable of encoding to 8-bit accuracies at a 5 megacycle/second (mc./s.) rate and to less accuracies at higher rates. An 8-bit accuracy represents a linear dynamic range of 48 db.

The digital output signals of encoder 20 are supplied through a digital cancellation stage 24 and a sweep selection gate 26 to a processor 30. One function of the processor is to store the digital signals produced by encoder 20 of selected ones of the sweeps at any given dwell time. Another function of the processor is to extract the digital signals from the various selected sweeps, representing video from the same range and serially supply these signals to a single Doppler filter bank such as bank 13 of FIGURE 1. Thus the processor performs a double function, in that it stores selected sweeps of each dwell time in digital forms and range gates the digital signals to a single filter bank. Due to these functions, in FIGURE 2, processor 30 is designated as the sweep storing and range gating processor, though hereafter it will be referred to simply as processor 30.

The sweep storing and range gating operations of processor 30, as well as the operation of gate 26, are controlled by the timing control circuit 22. The function of the sweep selection gate 26, which will hereafter be described in greater detail, may briefly be defined as limiting the digitized sweeps at the given dwell time which are supplied to processor 30 in order to minimize the effect of the spreading of the clutter frequency spectrum resulting from a finite rather than an infinite dwell time.

The function of the digital cancellation stage is to substantially cancel the clutter component in each digital signal from the encoder 20, supplied to processor 30. This is accomplished by one or more serially connected cancellers. Each canceller includes means for providing at least one sweep interval delay so that video at a particular range from adjacent sweeps can be compared. Digital delay lines are often used for such purposes, but need not be limited thereto. Other digital memory means may be employed. Referring to FIGURE 4, there is shown the stage 24 in block diagram as comprising two canceller units 32 and 34, connected in series between encoder 20 and gate 26. Unit 32 includes a subtractor 32a and a sweep delay line 32b, both supplied with the output of encoder 20, the output of line 32b being supplied as another input of subtractor 32a. Line 32b provides one sweep interval delay. Thus, the output of delay line 32b which represents the digital video at a particular range in the previous sweep is then subtracted digitally from the number at the output of the encoder which is at the same range in the current digitized sweep. The difference which represents the residue from a single cancellation unit is fed to subtractor 34a and delay line 34b of cancellation unit 34, the digital output of which represents the residue from both units.

It should be appreciated that since the signals supplied from encoder 20 are digital, the subtractors 32a and 34a and delay lines 32b and 34b may be digital. Also, since the signal from encoder 20 is a multibit number, a separate delay line and subtractor in each unit must be provided for each bit. For example, assuming that the signal from encoder 20 is of 8 bits, a set of 8 parallel delay lines such as magnetostrictive lines, one line per bit need be provided in unit 32. Since by the cancellation process of unit 32 the dynamic range of the input target plus clutter signal has been reduced, the number of parallel bits supplied to unit 34 may be reduced. With a clutter cancellation of 18 db in unit 32, the number of dynamic range bits can be reduced from 8 to 5 so that in unit 34 only 5 parallel delay lines 34b are required. Since the dynamic range of the video is further reduced by unit 34, the output thereof may be a four bit digital signal which changes in amplitude at the sampling frequency $1/\delta$.

It should be appreciated that since the signals in the cancellation unit change only once each pulse width $\delta$, the delay accuracy of lines 32b and 34b need be controlled only to within one half of this interval, thereby eliminating the need for precision delay lines. Signal amplitudes are preserved by the digital number, thereby eliminating the requirement for gain matching of parallel channels. It should further be appreciated by those familiar with the art that whereas in FIGURE 2 the encoder 20 is shown preceding the cancellation stage which, due to the digital output of encoder 20, operates on digital numbers, the analog sweeps comprising radar video may be supplied to analog cancellers, followed by an A/D encoder such as encoder 20, but for the reduced number of encoding bits that would be required if the encoder were to follow the cancellation stage 24.

Figure 5:
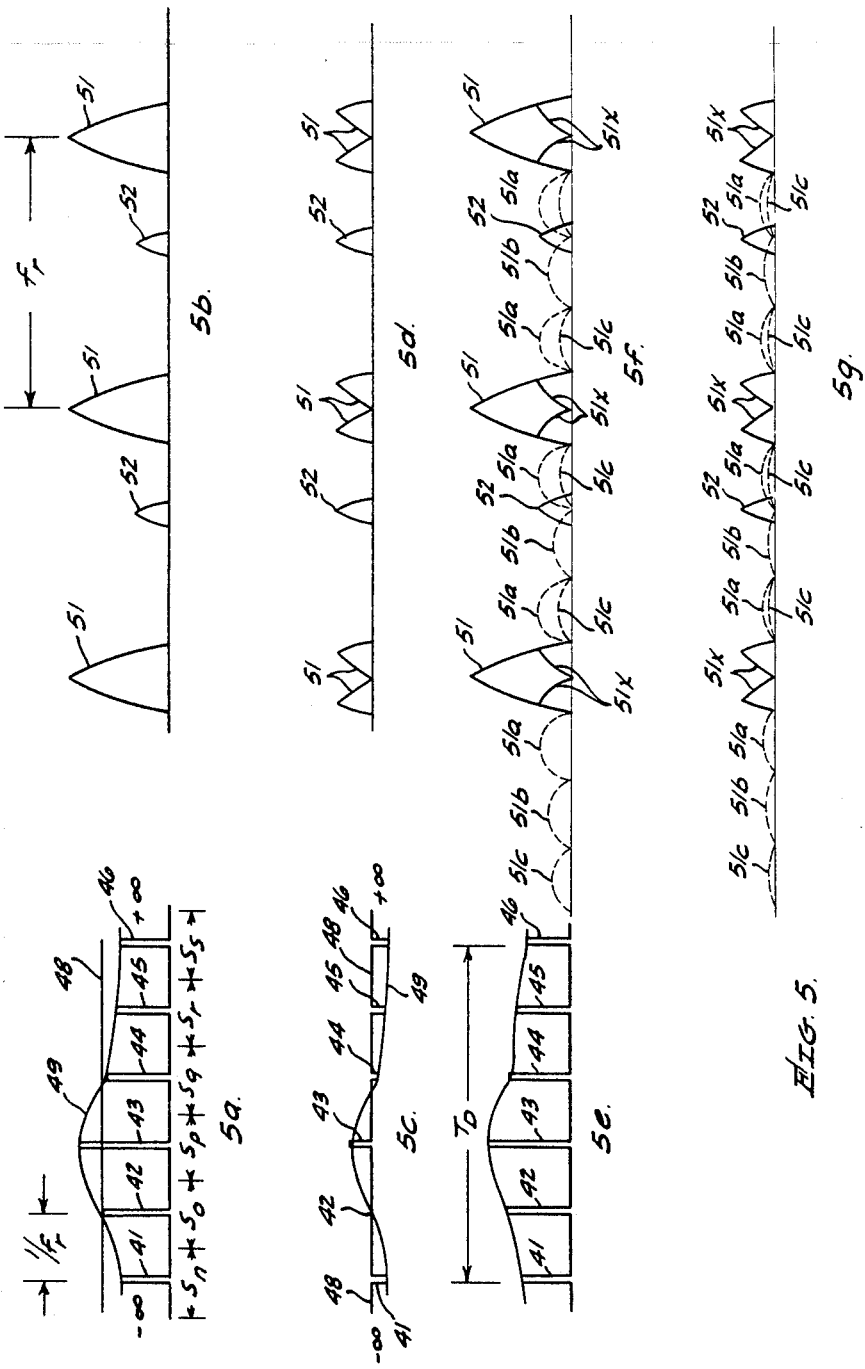

Herebefore, the function of sweep selection gate 26 has been briefly defined as selecting the digitized sweeps in a given dwell time which are supplied to processor 30 to minimize the effect of clutter frequency spectrum spreading due to the finite character of the dwell time. For a better understanding of the effect of finite dwell time on the frequency spectrum spreading of the clutter signals, reference is made to FIGURES 5(a) through 5(g). Assuming an infinite dwell time, that is, an infinite train of transmitted pulses at the PRF $f_r$, then radar video from each range may be represented by signals having amplitudes which are functions of the clutter plus target echoes received by the radar receiver during each sweep. In FIGURE 5(a), lines 41 through 46 represent the amplitudes of signals received from a range such as $R_T$ during sweeps $S_n$ through $S_s$ respectively, which are part of an infinite series of sweeps as indicated by the signs $-\infty$ and $+\infty$. In FIGURE 5(a), line 48 represents the envelope of the clutter component of each signal indicating substantially a DC plus clutter modulation component, while the target modulation component of each signal modulates about line 48 as indicated by line 49. The frequency spectrum of the clutter and target signals received in an infinite series of sweeps is diagrammed in FIGURE 5(b), where lines 51 represent main lobe clutter frequency spectrum and lines 52 represent the target frequency spectrum.

As seen in FIGURE 5(b), both clutter and target frequency lines are spread out, which as is appreciated by those familiar with the art, is due to the relative motion of the illuminated area and other factors. The spreading of the clutter frequency lines may be attributed to clutter internal motion, different Doppler frequencies within the illuminated ground patch due to radar motion as well as the rotation of the radar antenna. On the other hand, the spreading of the target's frequency lines may be due to target scintillation. In FIGURE 5(b) as well as in FIGURES 5(d), 5(f) and 5(g), the frequency and amplitudes are drawn along the abscissa and ordinate respectively.

By utilizing a cancellation stage such as stage 24 hereinbefore described, the clutter effect may be greatly reduced as indicated in FIGURE 5(c), wherein the amplitudes of the lines shown therein, represent only the target modulation about the clutter amplitude level designated by line 48. The clutter frequency spectrum is affected as shown in FIGURE 5(d) wherein it is seen that the amplitudes of the main lobe clutter lines 51 are greatly reduced, thereby greatly enhancing the target-to-clutter amplitude ratio.

As herebefore indicated, FIGURES 5(a) through 5(d) relate to infinite dwell time situation. If, however, the dwell time is finite, as indicated in FIGURE 5(e) by arrow $T_D$ so that lines 41 through 46 represent signal amplitudes in a finite sequence of sweeps, the clutter frequency spectrum, in addition to including main lobes 51, also includes secondary lobes 51a, 51b and 51c associated with each main lobe 51, as shown in FIGURE 5(f). As seen therefrom, some of the secondary lobes are in the target frequency spectrum. Also their amplitudes are large enough to practically overshadow the target so that distinguishing the target from clutter becomes most difficult. Using a cancellation stage would only reduce the main lobes 51 as indicated by lines 51x, but will not affect appreciably the secondary lobes 51a, 51b and 51c.

However, in accordance with the teachings of the invention, the effect of a finite dwell time on the spreading of the clutter frequency spectrum is greatly minimized by selecting the sweeps which are to be processed. Briefly, sweeps indicated by lines 41 and 42 and 45 and 46, which are the first and last two sweeps of the finite dwell time, can only be partially cancelled in stage 24. Therefore, they are rejected so that those sweeps which are utilized seem to be a part of an infinite series of sweeps, i.e. of an infinite dwell time. Referring again to FIGURES 3 and 4, since cancellation stage 24 comprises two cancellation units, it is appreciated that if the dwell time T [FIGURE 3(a)] includes nine pulses $P_1$ through $P_g$, providing sweeps $S_1$ through $S_g$, and assuming a steady state being reached before sweep $S_3$, only sweeps $S_3$ through $S_7$ are completely cancelled in the cancellation stage 24. This is due to the fact that with two cancellation units, a sweep to be completely cancelled must be preceded and followed by at least two sweeps. Thus in accordance with the teachings of the invention, sweep selection gate 26 is controlled by the timing control circuit 22 (FIGURE 2) to enable only the selected digitized sweeps to enter processor 30. In the foregoing example, gate 26 is closed until time $t_3$ when the first signals of sweep $S_1$ are available from stage 24. It remains open until time $t_8$.

If stage 20 were to include a single cancellation unit, the gate 26 would have been opened at time $t_2$ until $t_g$ to enable sweeps $S_2$ through $S_8$ to pass therethrough, and inhibit the passing through of partially cancelled sweeps $S_1$ and $S_g$. By inhibiting the processing of only partially cancelled sweeps as seen from FIGURE 5(g), the main clutter lobes 51, as well as the secondary lobes 51a, 51b and 51c, are greatly attenuated by the cancellation process, so that the target to clutter amplitude ratio is greatly enhanced, thereby improving the target detection.

From the foregoing, it should be appreciated that the A/D encoder 20, cancellation stage 24 and gate 26 perform the following functions: encoder 20 digitizes each analog sweep into a group of multibit numbers or digital signals, each representing the radar video from another contiguous range; cancellation stage 24 reduces the dynamic range of the clutter plus target signal, by substantially cancelling the clutter effect; and sweep selection gate 26 selects the digitized sweeps to be processed to overcome the clutter frequency spectrum spreading caused by the finite dwell time. In the foregoing example, it has been assumed that each output of encoder 20 is of 8 bits. However, due to the reduction in dynamic range of the signals, the digital signals supplied to the processor 30 can be only of 4 bits.

Reference is now made to FIGURE 6 which is a block diagram of circuitry of the processor 30, necessary to process one of the bits of the 4 bit signal supplied thereto. Identical circuitry is used for the other three bits. The processor 30 includes for each bit a series of serially connected delay lines designated in FIGURE 6 by numerals 61 through 65. The number of lines equals the number of selected sweeps. Since herebefore it has been assumed that the dwell time produces nine sweeps with the first two and last two being eliminated by the sweep selection gate 26, only five delay lines are shown in FIGURE 6. Each line is long enough or has a number of bits equal to the number of digital numbers into which each sweep is digitized, i.e. the number of ranges to be searched.

The output of each delay line is connected to a shift register 66, being of a number of bits equal to the number of lines. Both the shift register 66 and the delay lines 61 through 65 are controlled by the timing control circuit 22 (FIGURE 2). The delay lines are controlled to clock thereinto the digital signals from gate 26 at the sampling rate $1/\delta$ so that each signal represents the clutter rejected video from another range. Thus for example after gate 26 is enabled at time $t_3$ (FIGURE 3(b)) to permit digitized cancelled sweep $S_3$ (FIGURE 3(c)), to pass therethrough, signals are stored and continuously shifted to the right at the sampling rate $1/\delta$. Assuming that each sweep is digitized into 1000 ranges, each delay line is of 1000 bits so that after an interval of $1000\delta$ after time $t_3$, the digitized sweep $S_3$ is stored in line 61. The digitized sweeps continuously advance in the delay lines so that at $t_7+1000\delta$, digitized sweeps $S_3$ through $S_7$ are stored in lines 65 through 61 respectively.

When all the selected digitized sweeps $S_3$ through $S_7$ are stored in the delay lines 61 through 65 respectively, control circuit 22 energizes the shift register 66 via a line 68 so that at the next sampling clock signal, the output of each of the lines is transferred to another bit of register 66. Thus, the outputs of lines 61 through 65 are stored in bits $B_{61}$ through $B_{65}$ respectively of register 66.

From the foregoing, it should be appreciated that the outputs of the various lines represent digitized video in different sweeps from the same range interval. The transfer of the signals to register 66 is accomplished in parallel. After signals are transferred to register 66, it is operated at high enough a rate to serially read out the content thereof to a D/A encoder 70 before the next delay line clock signal. Thus between sampling clock signals the output of the decoder comprises analog signals representing the radar video received during the selected sweeps from a selected range interval. Since the data in the delay lines 61 through 65 advances at the sampling rate, the outputs thereof vary once each sampling interval $\delta$. At the start of each interval, the shift register is loaded with signals representing video in successive sweeps from another range interval, and before the end of the interval, the signals are serially read out therefrom. Consequently, the entire readout process for the selected sweeps of the finite dwell time can be accomplished in a single sweep interval.

For a system with a pulse width, $\delta$ of .5 microsecond, and a storage of twenty selected sweeps, the shift register would operate at a clock rate of 40 mc., accomplishable with present state of the art digital systems. The readout speed may however be cut in half by adding one more delay line unit and reading out every other range increment. In general, the readout speed may be cut by $1/M$ for the addition of M delay line units and reading out every Mth range interval.

As herebefore pointed out, the circuitry of processor 30 shown in FIGURE 6 is for the storing and gating of only one of the four bit signals supplied thereto from gate 26, and therefore four such circuits are required so that the 4 bit D/A decoder 70 is actually provided with a four bit input from four register-like register 66. The analog output of decoder 70 is supplied to a Doppler filter bank for target detection in manners well known in the art.

It should be appreciated at this point that since during each sampling interval $\delta$ the output of the four shift registers is a group of 4-bit digital signals representing video in successive sweeps from the same range interval, the signals from successive range intervals being supplied as groups of signals during successive sampling intervals, a single bank of Doppler filters may be used to analyze signals from different ranges at successive sampling intervals. The single bank of filters may be used regardless of the number of range intervals which are searched since the signals from each range interval of all the sweeps in a given dwell time are serially supplied to the filters. Such a capability is most advantageous since it requires the use of a single bank of filters regardless of how high the number of range intervals to be searched or how low the PRF.

Since the output of decoder 70 is a series of groups of signals, each group representing video from another range interval in a sequence of successive sweeps, it may be desirable to weight the amplitudes of the readout signals in order to further minimize the spreading of the clutter spectrum into the target Doppler filters, the spreading being caused by the finite dwell time. Weighting may be conveniently accomplished to a high degree of accuracy by including a digital signal weighting storage unit 72 wherein the various weighting factors are stored. Unit 72 is controlled by circuit 22 to serially read out these factors at the same rate that signals are read out from the register 66. The output of unit 72 is supplied to a D/A decoder 74 which converts the digital weighting factors from unit 72 to analog signals which control the operation of the decoder 70 so that each analog output thereof is a product of the four bit digital signal from the four registers such as 66 and the weighting factor from unit 72.

The operational time relationships of the various subsystems of the present invention may best be summarized in conjunction with FIGURE 7 wherein lines $t_1$ through $t_9$ represent the transmitted PRF, and lines $t_{1a}$ through $t_{1n}$, $t_{2a}$ through $t_{2n}$, etc. represent the sampling clock signals used to control the digitizing of each video sweep in encoder 20 (FIGURE 2). Lines $t_{open}$ and $t_{close}$ represent the two signals supplied to gate 26 to enable the passing therethrough of signals representing sweeps of an apparent infinite dwell time. Then, as herebefore described, when lines 61 and 65 (FIGURE 6) are filled with digitized sweeps $S_3$ through $S_7$, which occurs after time $t_8$ as the signals are clocked out of line 65 each sampling clock period shift register clock signals $t_s$ are supplied to shift register 66 (FIGURE 6) to serially read out therefrom the signals transferred thereto in parallel from lines 61 through 65. In FIGURE 7, only five $t_s$ signals are shown since shift register 66 is shown comprising five bits.

There has accordingly been shown and described herein a novel clutter rejection system. Therein, digital techniques are employed to digitize each analog sweep of radar video comprising clutter and target echo produced by a transmitted radar pulse in a sequence of pulses of a finite dwell time. The system includes a digital data processor for storing selected digitized sweeps. The processor also includes circuits such as shift registers into which groups of digital signals representing video in successive sweeps from the same range interval are written into in parallel and read out in series before a group of signals from a contiguous range interval are written thereinto.

The system also includes a sweep selection gating arrangement whereby only selected digitized sweeps are supplied to the processor to minimize the spreading of clutter into the target frequency spectrum which results from a finite dwell time. In addition, the system includes a digital cancellation stage for clutter rejection which, due to its digital mode of operation, is less critical to adjust the time delay accuracies and channel gain relationship than is necessary in comparable analog cancellation units.

It should be appreciated by those familiar with the art that modifications and/or equivalents may be made in the arrangements without departing from the true spirit of the invention. For example the digital output of register 66 (FIGURE 6) may be directly processed rather than first converting it to an analog signal in decoder 70 before transfer to the Doppler filter bank. Therefore, all such modifications and/or equivalents are deemed to fall within the scope of the invention as claimed in the appended claims.

What is claimed is:

1. A system for processing radar video received as a plurality of signal sweeps in response to transmitted radar pulses in a selected dwell time interval said system comprising:
converting means responsive to analog radar video for converting said video to digital signals;
digital cancellation means including at least one cancellation unit responsive to the output of said converting means for providing cancelled digital signals in related sweeps; and
a digital data processor including a plurality of data storing means for storing the cancelled digital output signals of said cancellation means representing radar video from selected ones of radar sweeps of a radar dwell time, said processor further including readout means for serially reading out the digital signals from each radar range received during each of said selected radar sweeps.

2. The system defined in claim 1 further including sweep selection gating means interposed between said digital cancellation means and said processor for limiting the cancelled digital signals supplied to said processor to comprise signals from completely cancelled video sweeps.

3. The system defined in claim 2 wherein said digital cancellation means comprises N cancellation units said sweep selection gating means inhibiting the transfer of digital signals to said processors of at least the first N and last N sweeps in said selected dwell time.

4. The system defined in claim 3 wherein said plurality of data storing means comprises delay lines equal in number to the number of selected sweeps the signals of which pass through said sweep selection gating means, each delay line includes means for storing digital signals of a complete sweep, said processor further including a shift register of a bit capacity equal in number to said selected sweeps.

5. A system for processing radar video signal received as a plurality of analog signal sweeps representing clutter and target echoes from a plurality of ranges in response to radar pulses transmitted thereto in a selected dwell time, said system comprising:
first means for converting each of said analog signal sweeps into digital signals at a preselected sampling rate, each signal representing the video from another radar range;
at least one cancellation unit including means for providing an output signal representing the difference of the video received from each range during successive sweeps;
a digital radar data processor including a plurality of data storing means for storing the output signals of said cancellation unit, each data storing means storing the signals representing cancelled video of another sweep;
means responsive to said stored signals for serially reading out the signals representing video from each of said ranges in a sequence of said sweeps; and
means for limiting the signals supplied to said processor from said cancellation unit to signals from completely cancelled sweeps.

6. The system defined in claim 5 further including sweep video selecting means disposed between said cancellation unit and said digital processor for limiting the cancelled video supplied to said processor to video from preselected sweeps in said dwell time.

7. The system defined in claim 6 wherein said selecting means supply video to said processor from the sweeps in said dwell time except for at least the video of the first N sweeps and the last N sweeps in said dwell time, N being equal to the number of the cancellation units.

8. The system defined in claim 6 wherein each of said data storing means in said data processor comprises a digital delay line including means for sequentially storing therein the digital video of another of said sweeps the number of said delay lines being equal to the number of said preselected sweeps in said dwell time.

9. The system defined in claim 8 wherein said plurality of digital delay lines are connected in series whereby the output of one line is connected to the input of another line, said processor further including a data shifting register responsive in parallel to the outputs of said digital delay lines; and
means for serially reading out the data from said data shifting register.

10. The system defined in claim 9 wherein said selecting means supply video to said processor from the sweeps in said dwell time except for the video of the first N sweeps and the last N sweeps in said dwell time, N being equal to the number of the cancellation units, the number of said digital delay lines being equal to the number of sweeps in said dwell time at least less 2N.

11. In a radar system wherein radar video received as a sequence of analog sweeps each sweep representing clutter and target echoes responsive to another pulse in a sequence of radar pulses transmitted in a selected dwell time, said radar system including
banks of Doppler filters in target detection circuitry for analyzing said sweeps to detect targets at different ranges, the improvement comprising:
converting means for converting each analog sweep into a series of digital signals produced at a predetermined sampling rate, each digital signal representing video received from another target range;
a digital radar data processor;
at least one digital cancellation unit including delay means responsive to the digital signals produced in said converting means for delaying said signals by a time interval equal to the time interval between N sweeps, N being an integer, said cancellation unit further including means responsive to said delayed and undelayed digital signals for providing difference digital signals therebetween;
means for supplying said difference digital signals to said processor, said processor including digital signal storing means for storing the signals supplied thereto, and a shift register responsive in parallel to difference digital signals representing video signals in said sequence of sweeps from another target range;
means for serially reading out the difference digital signals in said shift register; and
a single bank of Doppler filters for sequentially analyzing said serially read out signals representing video signals in said sequence of sweeps from another range to detect targets therein.

12. The system defined in claim 11 further including signal gating means disposed between said processor and said cancellation unit for limiting the signals supplied to said processors to digital signals representing video of selected ones of said sequence of sweeps in said dwell time.

13. The system defined in claim 12 wherein the selected sweeps exclude at least the first N and the last N sweeps in said dwell time, N representing the number of digital cancellation units, whereby the signals provided by said processor comprise completely cancelled digital signals of any apparent infinite dwell time.

14. The system defined in claim 13 wherein each of said difference digital signals is a multibit signal, said processor including for each signal bit a set of serially connected shift registers equal in number to the number of selected sweeps, each register being of a number of bits equal to the number of digital signals produced by said converting means in converting an analog sweep, a parallel read-in serial read-out data shifting means, and means for reading in the outputs of all said shift registers into said data shifting means in parallel and for serially reading out the contents thereof.

No references cited.

RODNEY D. BENNETT, *Primary Examiner.*

C. L. WHITMAN, *Assistant Examiner.*